Figure 1:
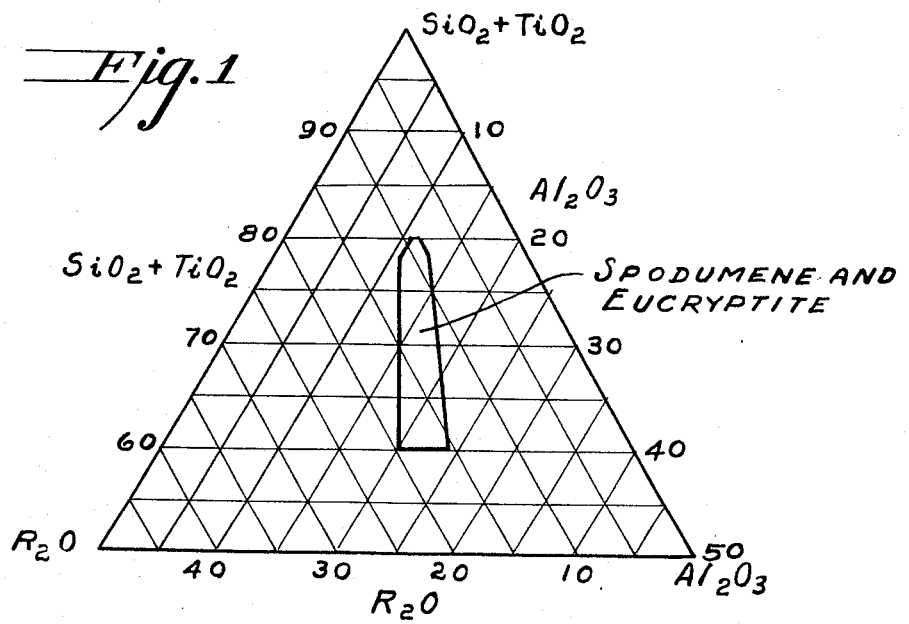

INVENTORS
LORIS G. SAWCHUK
AND STANLEY D. STOOKEY

By Clarence R. Patty Jr.
ATTORNEY

INVENTORS
LORIS G. SAWCHUK
AND STANLEY D. STOOKEY

United States Patent Office 3,282,770
Patented Nov. 1, 1966

3,282,770
TRANSPARENT DIVITRIFIED STRENGTHENED GLASS ARTICLE AND METHOD OF MAKING IT
Stanley D. Stookey and Loris G. Sawchuck, Corning, N.Y., assignors to Corning Glass Works, Corning, N.Y., a corporation of New York
Filed May 16, 1962, Ser. No. 195,223
5 Claims. (Cl. 161—1)

This invention relates to the manufacture of transparent, high-strength ceramic bodies. More specifically, this invention relates to the manufacture of glass articles of extremely high mechanical strength by providing a surface layer thereon of crystalline material.

In United States Patent No. 2,779,136, of which one of the inventors is a co-patentee, is described a means of producing glass articles having high mechanical strength by providing them with a stress of substantially uniform compression in the surface and parallel therewith. That invention was based upon the observation that, when a glass body containing $Na_2O$ or $K_2O$ is brought into contact with a low melting lithium salt, an exchange of alkali metal ions between the glass and the molten salt occurs and lithium ions migrate or diffuse into the glass in exchange for sodium or potassium ions. Experience demonstrated that when the molten lithium salt was at a temperature below the strain point of the glass, the exchange of ions established such a tensional stress on the surface of the glass body, resulting from the smallness of the lithium ion when compared with either the sodium or potassium, that minute checks or cracks developed in the surface which ultimately caused breakage. Laboratory investigations determined that such stress and breakage could be prevented if the article during ion exchange was maintained at a temperature above its strain point and if the amount of lithium exchanged was the molar equivalent of the amount of sodium and potassium displaced thereby. The weight of lithium thus introduced into the glass, computed as $Li_2O$, was approximately one half the weight of the displaced $Na_2O$ plus one third the weight of the displaced $K_2O$. This displacement and diminution in the weight percentage of alkali metal oxide in the glass results in a lower thermal expansion coefficient in the portion of the glass wherein such exchange has occurred as compared with the original thermal expansion coefficient of the glass. Since the ion exchange is progressive in character and moves inwardly from the surface, the glass body is thus provided with a surface layer having a lower thermal expansion coefficient than its interior. Therefore, this method yielded a body having a surface compressional layer thereon which, as is well-recognized in the ceramic art, leads to a substantial increase in the mechanical strength of the body.

Another discovery described in that patent was that in silicate glasses containing alumina, the lithium ions on diffusing into the glass would, under some conditions, react with $Al_2O_3$ and $SiO_2$ in the glass to form very small crystals of beta-spodumene ($Li_2O \cdot Al_2O_3 \cdot 4SiO_2$) therein. This occurrence causes a further pronounced lowering of the thermal expansion coefficient of the surface reaction layer since beta-spodumene has a thermal expansion coefficient which is nearly zero and, moreover, the reaction leaves the glass matrix of the surface layer with a lower content of alkali metal oxide and, hence, a lower thermal expansion than it would have had if the reaction and crystallization has not occurred. The formation of beta-spodumene in the surface compressional layer, therefore, was the principal desideratum of that patent. It was learned that tensile strengths in excess of 15,000 p.s.i. and as high as 75,000 p.s.i. could be attained thereby. Development of beta-spodumene in glasses containing $Al_2O_3$ will occur spontaneously at the surface of the glass. However, its development within the surface requires the presence of a crystallization-promoting or nucleating agent in the glass to initiate crystallization. Titania, $TiO_2$, was found to be the ideal nucleating agent and, when present in amounts ranging from 3–15% by weight, tended to form nuclei when the glass was cooled. Beta-spodumene crystals formed and grew upon these nuclei when lithium ions from the molten salt diffused into the glass, provided the ratios of alkali metal oxide to $Al_2O_3$ and to $TiO_2$ were not too high. This proviso was necessary because the nuclei of $TiO_2$ are soluble in, and do not form in the presence of, a sufficiently high concentration of alkali metal oxide. Also, high expansion crystals such as lithium silicates form instead of beta-spodumene and beta-eucryptite. Thus, if the ratio of the weight percentage of the alkali metal oxide with respect to the $TiO_2$ is too high, the interior of the glass will remain transparent and crystals of beta-spodumene will form only at the surface. If the ratio of alkali metal oxide to alumina is too high, crystals other than beta-spodumene and beta-eucryptite are precipitated.

One characteristic of the product described in that patent, and which the present invention is designed to improve, is that the highest strength, i.e., strengths of 30,000 p.s.i. and over, are obtained only when the final body is opaque or translucent. These bodies have been very useful in missile cones, dinnerware, electrical insulators, and other applications where opacity is no drawback. However, it was realized that a transparent glass-ceramic of extremely high strength would be of great potential value for high strength windows for airplanes, automobiles, schools, space vehicles, and the like, as well as other applications where transparency would be an added advantage.

It is therefore, the principal object of this invention to provide a method of manufacturing a transparent, extremely high strength article composed of a glass body having a crystalline surface compressional layer thereon.

Another object of this invention is to provide a method of manufacturing transparent bodies having a tensile strength in excess of 40,000 p.s.i. and, in some instances, as much as 120,000 p.s.i.

Still another object of this invention is to provide a method of manufacturing transparent, high-strength articles which is applicable to glass articles formed by blowing, pressing, drawing, rolling, and other known methods, and which is relatively simple in operation and economical in practice.

Other objects of the invention will be apparent from the description hereinafter appended.

We have discovered that transparent glass-ceramic articles having a modulus of rupture of at least 40,000 p.s.i. can be manufactured from glasses of very narrow composition limits by means of a particular heat treatment followed by an ion exchange reaction.

Speaking in the most general terms, our invention is applicable to glass-forming compositions consisting essentially, on a mole percent basis, of 56–73% $SiO_2$, 4–7% $TiO_2$, 8.5–20% total of at least one alkali metal selected from the group consisting of $Li_2O$, $Na_2O$, and $K_2O$, the ratio of $Li_2O:R_2O$ being not more than 0.9, and 11–24% $Al_2O_3$, the $Al_2O_3:R_2O$ ratio being at least 1.0 but not more than 1.5. As employed in this specification, $R_2O$ refers to the alkali metal oxides $Li_2O$, $Na_2O$, and $K_2O$. Glasses having compositions falling within the above ranges are prepared from batch materials which may be either the oxides or other compounds, which, on being fused together, are converted to the desired oxide compositions in the required proportions. The batches are melted in crucibles, pots, or tanks, depending upon the quantity and size of the articles desired, at a temperature from about 1400°–1600° C. for about 4–16 hours. The batch ingredients are preferably ball milled and the melt stirred to insure glass homogeneity. The molten glass is then formed into shape by conventional glass working methods such as pressing, drawing, rolling, blowing, and the like. The shape is then preferably annealed in a lehr and cooled to room temperature.

Table I sets forth examples having compositions demonstrating the extraordinary strength, combined with transparency, attainable in bodies following the method of our invention computed from their respective batches to the oxide basis in mole percent, exclusive of impurities which may be present in the batch material.

TABLE I
[In percent]

|  | 1 | 2 | 3 | 4 | 5 | 6 | 7 | 8 | 9 | 10 | 11 | 12 |
|---|---|---|---|---|---|---|---|---|---|---|---|---|
| $Na_2O$ | 6.9 | 14.3 | 11.8 | 9.2 | 9.2 | 0.9 | 4.8 | 4.9 | 4.5 | 9.0 | 5.5 | 5.1 |
| $Li_2O$ | 6.9 | | 2.4 | 4.7 | | 8.5 | 8.1 | 7.0 | 6.7 | 3.2 | 7.7 | 8.3 |
| $Al_2O_3$ | 15.1 | 16.0 | 15.7 | 15.4 | 14.9 | 13.1 | 14.4 | 13.3 | 14.1 | 14.5 | 14.9 | 14.4 |
| $SiO_2$ | 66.2 | 64.0 | 65.0 | 66.0 | 65.6 | 73.0 | 69.0 | 70.0 | 69.9 | 68.2 | 67.3 | 67.9 |
| $TiO_2$ | 4.9 | 5.6 | 5.1 | 5.0 | 6.3 | 4.6 | 4.3 | 4.7 | 4.9 | 5.0 | 4.5 | 4.3 |
| $K_2O$ | | | | | 3.6 | | | | | | | |
| $Al_2O_3/R_2O$ | 1.02 | 1.12 | 1.11 | 1.11 | 1.17 | 1.4 | 1.11 | 1.12 | 1.25 | 1.19 | 1.12 | 1.08 |
| $Li_2O/R_2O$ | 0.50 | 0 | 0.17 | 0.34 | 0 | 0.9 | 0.63 | 0.58 | 0.6 | 0.26 | 0.58 | 0.62 |

Processing the glass articles according to the preferred embodiment of our invention in order to obtain the desired properties generally requires three steps. First, the article is given a preliminary heating in air, which we have designated as "previous thermal history," abbreviated to PTH. This consists of exposing the article to a temperature range of about 600°–750° C., holding thereat for a time varying from about 5 minutes to 5 hours, the time being shorter where temperatures near the higher end of said range are employed, and then allowing the article to cool to room temperature. Second, the article is reheated to a temperature approximating that of the salt bath, about 800°–900° C., and held thereat for several minutes. Third, the article is then immediately plunged into a molten salt bath for a period of time sufficient to develop the desired surface ion exchange with consequent crystallization, generally from about 3 minutes to 1 hour.

For greater speed of operation and fuel economies, the glass shape need not be annealed and cooled to room temperature after the melting and forming steps. However, it will be understood that the glass body must be cooled at least below its transformation point before the PTH step is begun. The transformation point is deemed to be the temperature at which the liquid melt is considered to have been transformed to an amorphous solid, generally in the vicinity of the annealing point of the glass (about 700° C. for the glasses herein).

We have discovered that the PTH markedly affects the clarity of the glass article. A PTH at too low a temperature will cause the glass to become translucent in the salt treatment while no PTH will result in translucent or opaque bodies in the salt treatment. A PTH at too high a temperature generally causes surface crazing during the subsequent processing in the molten salt bath.

The PTH can be performed by heating the article at any specific temperature within the prescribed range for an appropriate length of time or by exposing it to various temperatures within such range, such as by heating the article at a uniform rate within the range. Nevertheless, we have learned that the shorter heat treatments yield more suitable products in that the formation of opacifying phases is given less opportunity to occur, thus retaining the transparency of the glass. Therefore, our preferred PTH comprises exposing the glass article to a temperature of 750° C. for about 5 minutes.

The time of PTH can be varied to a considerable extent but if of too long duration generally results in the glass article becoming cloudy or milky during the heat treatment or causes surface crazing during the subsequent salt bath treatment. A relatively simple test for determining the proper time of PTH for a particular glass composition at a specific temperature consists of placing a group of cane samples in a furnace at the desired temperature, withdrawing individual canes at certain time intervals, and thereafter subjecting each of the samples to the salt bath treatment. The canes which have had a PTH of insufficient duration will become cloudy or milky in the salt bath treatment, whereas those which have had an excessive PTH will be cloudy or milky prior to the salt bath treatment or will be surface crazed upon cooling from the salt bath treatment.

The effect of the PTH is not completely understood but it is believed that it produces a phase separation in the glass whereby nuclei of $TiO_2$ are formed in exceedingly large numbers which are uniformly, though randomly oriented, dispersed throughout the amorphous phase, and that said nuclei cause the crystallization of other crystalline phases during the subsequent ion exchange process. These other crystals are so small they have extremely little capabilty to refract or disperse visible light, therefore not deleteriously affecting the transparency of the glass. An improper, or no, PTH is believed to result in the precipitation of large crystals of $TiO_2$ and other phases leading to opacity of the body.

The cooling of the article to room temperature after the PTH is not mandatory and is generally done only to permit visual inspection of the ware before treatment in the molten salt bath.

The step of heating the article in air to the temperature of the salt bath immediately prior to immersion therein, while not absolutely mandatory, serves two purposes. Breakage or spalling of the body due to thermal shock, which can be a problem when the article is cooled to room temperature after the PTH, can be avoided. Also, this preheating brings the article to the proper temperature such that the salt bath treatment will be uniform. This preheating step is usually accomplished by merely transferring the glass body to a furnace maintained at 800°–900° C. and holding thereat for about 2–5 minutes.

Any lithium salt or a mixture of said salts is useful which has a melting point below the softening point of the glass (about 950° C. for these glasses), and which does not decompose at the temperature of the treatment to such an extent as to make the molten salt alkaline enough to etch the glass considerably. Organic salts of lithium are generally unsuitable in this invention. Inorganic lithium salts which have low enough melting points and are sufficiently stable at the temperature of treatment include lithium nitrate, lithium sulfate, lithium acid sulfate, lithium chloride, lithium bromide, and lithium iodide. Where a salt has a melting point above the softening point of a glass, it may advantageously be mixed with another lithium salt to form either a eutectic mixture or one having an intermediate melting point. Decomposition of the molten salt can be suppressed by enclosing it and maintaining the total partial pressures of the gaseous decomposition products at one atmosphere or more during treatment of the glass body.

Lithium sulfate is the preferred main constituent of the salt bath of our invention. This salt melts at 860° C., but experience demonstrated that it should be used at 880° C. or higher. Lithium chloride (5–15 mole percent) was added to lower the melting point to 820°–

850° C., keeping only lithium ions available for the sodium-lithium exchange. However, troublesome corrosion of the glass occurred from the buildup of lithium hydroxide after the baths had been used for short periods. Adding ammonium sulfate helped only slightly. Further work led to the addition of 5-15 weight percent of sodium sulfate to the lithium sulfate instead of the lithium chloride. The preferred bath, wherein 5 weight percent of sodium sulfate is used with lithium sulfate, is useable in the 850°-900° C. range. We have found that the addition of this small amount of a non-lithium salt does not noticeably affect the efficiency and speed of the ion exchange reaction. Experimentation has shown that as little as a few percent by weight of a lithium salt is sufficient to carry out the exchange but the reaction is very slow because fewer lithium ions are available in the reaction zone at the surface of the article. Therefore, although in our preferred practice, which uses a concentrated lithium ion mixture, a soaking period of from about 3 minutes to 1 hour is sufficient to give satisfactory ion exchange and surface crystallization, it will be realized that different lithium ion concentrations and activities will require different soaking periods. However, the selection of suitable concentrations and times can readily be determined by one skilled in the art within the framework of the description set out about.

The following flow sheet is included as an aid in explaining the various procedural steps of the invention. The steps are segregated into those required for the invention and those which, though optional, are often performed to permit visual examination of the product, to protect the body from thermal shock, or for other reasons.

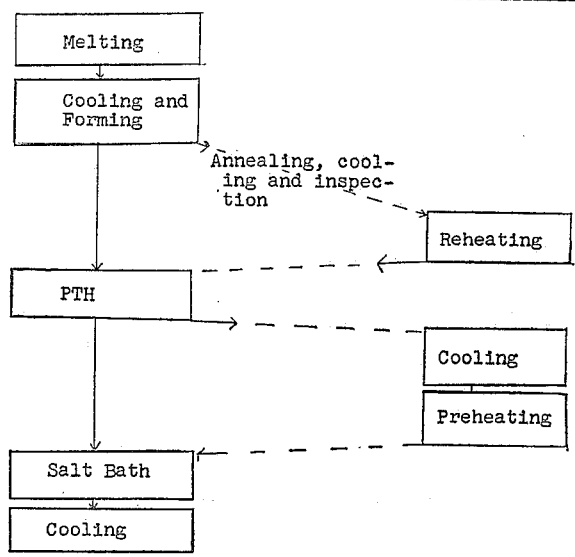

Thus, after the batch has been melted and then shaped by cooling below the transformation point of the glass, the body may be passed directly to a furnace maintained at 600°-750° C. and the PTH conducted, or it may be annealed and cooled to room temperature for visual inspection or merely for storing until it is desired to conduct the proper heat treatments. If it is cooled to room temperature, the body must be reheated to the PTH temperature range. This may be accomplished by plunging the body into a furnace maintained at that range or placed in a furnace at room temperature and heated to the PTH range.

Following the PTH step, the glass shape may be transferred directly to the salt bath or again cooled to room temperature for inspection. If the body is cooled to room temperature, a preheating step in air to the temperature of the salt bath is desirable to eliminate the hazard of breakage due to thermal shock.

After the salt bath treatment, the body is cooled to room temperature and any adhering salt advantageously washed off with water.

In carrying out our invention, the salt was melted in clay pots and crucibles having 96% silica glass liners. Other materials exhibiting good resistance to corrosion by lithium salts such as stainless steel may also be used.

X-ray diffraction analyses have determined the crystals in the surface compressional layer to be beta-spodumene ($Li_2O \cdot Al_2O_3 \cdot 4SiO_2$) or beta-eucryptite ($Li_2O \cdot Al_2O_3 \cdot 2SiO_2$). The displacement of sodium and/or potassium ions by lithium ions, as observed above, is greatest at the surface of the glass and progressively diminishes inwardly from the surface. The crystalization of beta-spodumene and beta-eucryptite diminishes in like manner but does not extend as far into the interior of the glass body as the lithium penetration. The boundary of the lithium penetration is not sharp and its depth cannot be measured exactly, although it can be approximated from the resulting stress pattern. The limit of crystal growth can be measured microscopically and the extent of the lithium penertation beyond this can be detected in a visible change in the refractive index of the glass. The average depth of penetration of lithium into articles manufactured from compositions listed in Table I above is usually less than 1 mm.

It will be appreciated that this crystallization and penetration varies directly with the time the article is immersed in the molten salt bath. Too short a treatment will not develop the optimum difference in physical properties between the surface and the untreated core. As noted above, beta-spodumene has a low coefficient of expansion and beta-eucryptite is considered to have a negative coefficient of expansion. Too long a treatment would also decrease the difference in properties between the surface and core. A treatment of sufficient duration to completely exchange lithium for sodium or potassium would result in a complete glass-ceramic which, though considerably stronger than the original glass, would not be as strong as the cased glass obtained by surface exchange. This situation has required the strict adherence to the time range of about 3 minutes to 1 hour for the actual ion exchange process when utilizing the salt bath of the preferred composition.

The mole ration of $Li_2O/R_2O$ is another critical factor in assuring an article possessing high strength. In high lithia glasses, the immersion in a lithium ion salt bath would have little differential effect, since there is but a small amount of sodium ion present to be replaced by the lithium. As the ratio of $Na_2O$ and/or $K_2O$ to $Li_2O$ in the original glass is increased, the strengthening effect of the lithium treatment is increased because the interior glass has a progressively higher expansion coefficient, while the exterior layers crystallize to spodumene or eucryptite and become very low in expansion. Thus, we have found it possible by a proper selection of the glass composition and salt bath treatment to fashion bodies of strengths ranging from 40,000 to 120,000 p.s.i. and various expansion coefficients ranging from $-10$ to $+70 \times 10^{-7}/°$ C. The higher strengths are accompanied by the higher expansions.

We have found that the mole ratio of $Al_2O_3/R_2O$ must be kept between 1 and 1.5 or translucent or opaque bodies result no matter what PTH and salt bath treatments are employed. This opacity is believed to be due to the formation of crystal phases other than eucryptite and spodumene.

Concentrations of $TiO_2$ greater than about 7 mole percent cause opacification during forming of the glass article due to the precipitation of rutile or anatase. Higher percentages of $TiO_2$ also hazard the possibility of opalizing during any future flameworking, such as firepolishing, of the material. The presence of less than 4 mole percent of $TiO_2$ results in insufficient nucleation of the thermally-induced phase separation, so that a translucent or milky glass is produced during the salt treatment. Also, this insufficient nucleation results in such a small amount of crystallization that the strengthening effect produced is very minor.

The amount of silica should not exceed about 73 mole percent or an excessively viscous melt results which requires melting temperatures higher than practical with conventional refractories.

We have found that the presence of small amounts of other oxides can be tolerated and may even be helpful. Such oxides include: $Rb_2O$ and $Cs_2O$, which can replace part of the $R_2O$; $B_2O_3$, useful as a flux; $ZrO_2$, useful in improving the stability of the glass; and $As_2O_3$ and $Sb_2O_3$, useful as fining agents. The maximum of such oxides separately or in combination should not exceed about 4 mole percent.

Table II records the PTH and salt treatment as well as a visual description, the expansion coefficient, and the modulus of rupture of articles made from each of the compositions set forth in Table I, following the melting and shaping practice outlined above. The modulus of rupture was obtained by the conventional method using rods which had been abraded with 30-grit silicon carbide. The method of measuring the linear thermal expansion coefficient is also well known and the values given in Table II represent the expansion coefficient between 25° and 300° C. A molten salt bath of 85 mole percent $Li_2SO_4$ and 15 mole percent LiCl was used in Examples 1–6 and a bath of 95 mole percent $Li_2SO_4$ and 5 mole percent $Na_2SO_4$ was used in Examples 7–12.

TABLE II

| Glass | PTH | Salt Treatment | Description | Expansion ($\times 10^7/°$ C.) | Modulus of Rupture, p.s.i. |
|---|---|---|---|---|---|
| 1 | 650°, 2 hrs | 800°, 15' | Clear | | 76,200 |
|   | 650°, 2 hrs | 800°, 30' | do | | 102,500 |
|   | 700°, 1 hr | 820°, 30' | do | | 75,600 |
| 2 | 600°, 4 hrs | 820°, 30' | do | | 67,230 |
|   | 600°, 4 hrs | 840°, 30' | do | | 109,000 |
| 3 | 625°, 2 hrs | 860°, 5' | do | 67.9 | 80,100 |
|   | 650°, 30' | 860°, 5' | do | 69.8 | 92,500 |
|   | 655°, 1 hr | 860°, 5' | do | 71.6 | 95,300 |
|   | 700°, 1 hr | 900°, 10' | do | 72.2 | 120,000 |
| 4 | 600°, 4 hrs | 840°, 30' | do | | 111,600 |
|   | 600°, 4 hrs | 820°, 30' | do | | 84,000 |
|   | 700°, 2 hrs | 840°, 10' | do | | 96,000 |
| 5 | 600°, 5 hrs | 800°, 1 hr | do | | 84,000 |
|   | 650°, 2 hrs | 840°, 1 hr | do | | 88,000 |
|   | 750°, 10' | 850°, 30' | do | | 94,000 |
| 6 | 600°, 4 hrs | 820°, 1 hr | do | | 68,000 |
|   | 750°, 15' | 860°, 30' | do | | 74,000 |
| 7 | 650°, 2 hrs | 840°, 10' | do | 43.7 | 58,400 |
|   | 650°, 1 hr | 860°, 5' | do | 27.6 | 62,600 |
| 8 | 650°, 1 hr | 860°, 5' | do | | 52,000 |
|   | 750°, 1 hr | 860°, 5' | do | | 57,000 |
|   | 650°, 2 hrs | 860°, 10' | do | | 63,600 |
|   | 650°, 2 hrs | 860°, 15' | do | 30.6 | 68,200 |
|   | 600°, 4 hrs | 900°, 10' | do | 15.0 | 50,000 |
| 9 | 700°, 1 hr | 860°, 10' | do | 36.1 | 59,800 |
|   | 700°, 1 hr | 880°, 5' | do | 44.1 | 56,000 |
|   | 700°, 1 hr | 880°, 5' | do | 44.1 | 56,000 |
|   | 700°, 4 hrs | 860°, 10' | do | 47.2 | 46,200 |
| 10 | 700°, 1 hr | 860°, 15' | do | 44.4 | 87,400 |
|   | 700°, 1 hr | 860°, 25' | do | 37.5 | 86,500 |
|   | 650°, 1 hr | 860°, 25' | do | 40.7 | 92,860 |
|   | 700°, 1 hr | 900°, 10' | do | 47.3 | 61,100 |
| 11 | 700°, 1 hr | 840°, 10' | do | 48.7 | 67,200 |
|   | 700°, 1 hr | 860°, 5' | do | 42.5 | 85,400 |
| 12 | 650°, 1 hr | 860°, 4' | do | | 49,900 |
|   | 650°, 1 hr | 860°, 5' | do | 33.9 | 73,800 |

The above table clearly indicates the extraordinary strengths which can be furnished to glass articles falling within the compositions set out in Table I by following the method of our invention. Example 3 is our preferred composition where mechanical strength alone is the critical property sought. However, where exceptional strength plus excellent resistance to thermal shock is required, Example 8, having a body with a very low coefficient of thermal expansion, is our preferred composition.

In each of the above examples, beta-eucryptite formed the major crystal phase precipitated in situ.

FIG. 1 sets forth the composition ranges of the batch components utilized in our invention. In order to define the invention in terms of a three-component system, the alkali metal oxides are grouped together as $R_2O$ and the relatively small amount of $TiO_2$ combined with the silica. The area of applicable compositions is rendered very small by the requirement that the ratio $Al_2O_3:R_2O$ be at least 1.0 but not more than 1.5. FIG. 1 also points out that eucryptite and spodumene are the crystal phases precipitated in glasses having these compositions.

Figure 2:
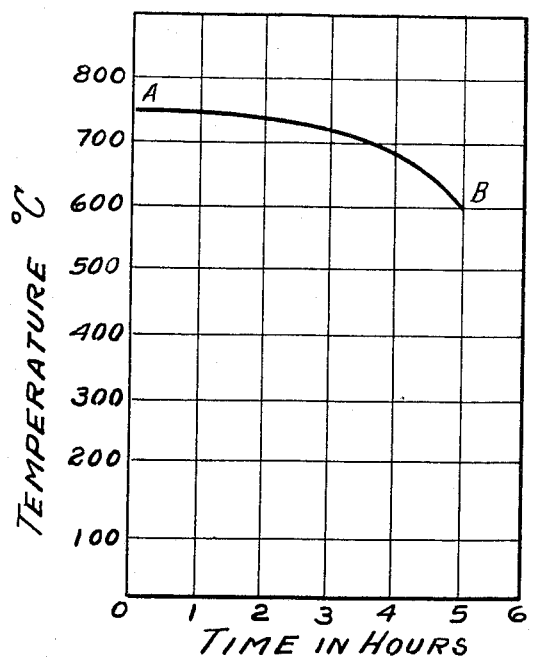

FIG. 2 records a time-temperature curve for the PTH heat treatment required in the invention. As noted hereinbefore, the time of heat treatment varies from about 5 minutes to 5 hours, the higher temperatures requiring a shorter exposure time. Thus, at 750° C., only about 5 minutes exposure is sufficient and continuation of the exposure for much longer will cause opacification. Experimentation has demonstrated that the relationship of time to temperature, as to the maximum time of exposure which will yield a transparent body, is not strictly linear but follows generally the hyperbolic curve AB set out in FIG. 2.

Figure 3:
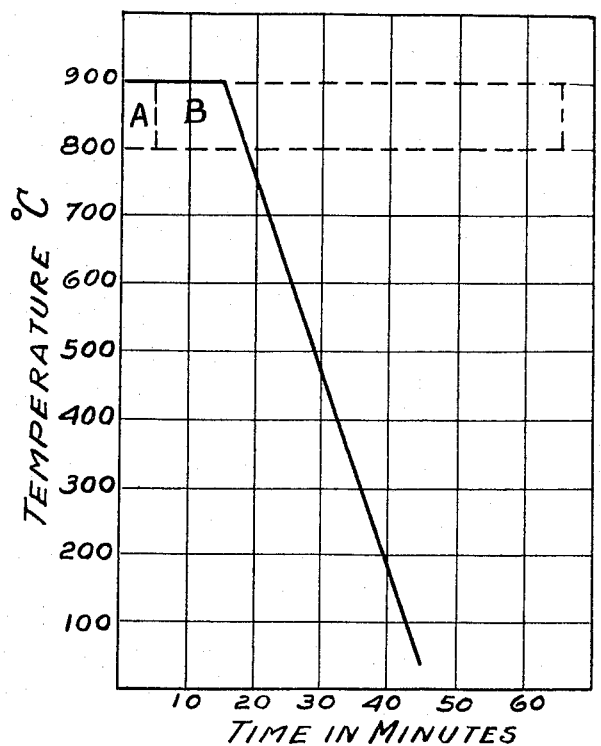

FIG. 3 depicts a time-temperature curve for the salt bath treatment required, using the concentrated lithium ion salt baths of the preferred embodiment of our invention. The use of a salt bath to promote alkali metal ion exchange is described in the aforementioned Patent No. 2,779,136. Therefore, this graph is included merely as an aid in explaining the complete process of the invention. The solid line represents the salt bath treatment of a specific example of my invention, viz., Example 3 recorded in Tables I and II, wherein after the batch had been melted by heating in a crucible at a temperature of about 1600° C. for 16 hours, shaped, annealed, and cooled to room temperature, the article was treated in accordance with the teachings of the invention. The body was given a PTH by plunging into a furnace maintained at 700° C., held thereat for 1 hour, and then removed from the furnace and allowed to cool to room temperature. Thereafter, the body was transferred to a furnace maintained at 900° C., held thereat for 5 minutes to preheat it to prevent breakage in the salt bath, immediately immersed in a molten salt bath of, by weight, 85% $Li_2SO_4$ and 15% LiCl, maintained at 900° C., held thereat for 10 minutes, and then removed from the bath, allowed to cool, and the adhering salt washed off with water. The letter, A, in FIG. 3 represents the time and temperature of the preheating step while the letter B, represents the time and temperature of the salt bath treatment. The areas surrounded by the dotted lines depict the ranges of these treatments. The use of a preheating step is optional, but it is included in this curve to complete the description of the invention.

Figure 4:

FIG. 4 shows a dinnerware plate which has been manufactured in accordance with the invention. The plate, shown generally as a side elevation in cross section at 1, consists of a crystalline surface layer, 2, overlaying a vitreous body portion, 3.

What is claimed is:
1. The method of producing a transparent, surface-crystallized, glass article which comprises the steps of melting a glass-forming batch consisting essentially, on the oxide basis in mole percent, of 56–73% $SiO_2$, 4–7% $TiO_2$, 8.5–20% total of at least one alkali metal oxide selected from the group consisting of $Li_2O$, $Na_2O$, and $K_2O$, the ratio $Li_2:R_2O$ being not more than 0.9, and 11–24% $Al_2O_3$, the ratio $Al_2O_3:R_2O$ being at least 1.0 but not more than 1.5, the total of said $SiO_2$, $TiO_2$, alkali metal oxide, and $Al_2O_3$ comprising at least about 96% of said glass, simultaneously cooling and forming the melt to a glass shape below the transformation point of the melt, thereafter exposing said glass shape to a temperature of at least about 600° C., but not higher than about 750° C., maintaining thereat for a period of time as generally defined by curve AB in FIGURE 2, subsequently contacting said glass shape with a molten lithium-salt-containing material at a temperature of at least about 800° C., but not higher than about 900° C., for a time sufficient to attain surface crystallization, and then cooling said shape to room temperature.

2. The method of producing a transparent, surface-crystallized, glass article which comprises the steps of melting a glass-forming batch consisting essentially, on the oxide basis in mole percent, of 56–73% $SiO_2$, 4–7% $TiO_2$, 8.5–20% total of at least one alkali metal oxide selected from the group consisting of $Li_2O$, $Na_2O$, and $K_2O$, the ratio $Li_2O:R_2O$ being not more than 0.9, and 11–24% $Al_2O_3$, the ratio $Al_2O_3:R_2O$ being at least 1.0 but not more than 1.5, the total of said $SiO_2$, $TiO_2$, alkali metal oxide, and $Al_2O_3$ comprising at least about 96% of said glass, simultaneously cooling and forming the melt to a glass shape below the transformation point of the melt, thereafter exposing said glass shape to a temperature of at least about 600° C., but not higher than about 750° C., maintaining thereat for a period of time as generally defined by curve AB in FIGURE 2, then exposing said glass shape to a temperature of at least about 800° C., but not higher than aout 900° C., maintaining thereat for about 2–5 minutes, subsequently contacting said glass shape with a molten lithium salt containing material at a temperature of at least about 800° C., but not higher than about 900° C., for a time sufficient to attain surface crystallization, and then cooling said shape to room temperature.

3. The method according to claim 1 wherein the time sufficient to attain surface crystallization ranges from about 3 minutes to 1 hour.

4. The method according to claim 2 wherein the time sufficient to attain surface crystallization ranges from about 3 minutes to 1 hour.

5. A transparent article comprising a glass body having on its surface a thin, compressive, crystalline layer, said crystalline layer being formed by exposing a glass body consisting essentially, on the oxide basis in mole percent, of 56–73% $SiO_2$, 4–7% $TiO_2$, 8.5–20% total of at least one alkali metal oxide selected from the group consisting of $Li_2O$, $Na_2O$, and $K_2O$, the ratio $Li_2O:R_2O$ being not more than 0.9 and 11–24% $Al_2O_3$, the ratio $Al_2O_3:R_2O$ being at least 1.0 but not more than 1.5, the sum of said $SiO_2$, $TiO_2$, $R_2O$, and $Al_2O_3$ comprising at least about 96% of said glass, to a temperature of at least about 600° C., but not higher than about 750° C., maintaining thereat for a period of time as generally defined by curve AB in FIGURE 2, thereafter contacting said glass body with a lithium salt-containing material at a temperature of at least about 800° C., but not higher than about 900° C., for a time sufficient to attain surface crystallization, and then cooling said body to room temperature.

References Cited by the Examiner
UNITED STATES PATENTS

| | | | |
|---|---|---|---|
| 2,651,146 | 9/1953 | Stookey | 65—30 |
| 2,779,136 | 1/1957 | Hood et al. | 65—30 X |
| 2,971,853 | 2/1961 | Stookey | 65—33 |

DONALL H. SYLVESTER, *Primary Examiner.*

G. MYERS, *Assistant Examiner.*